US010933983B2

(12) United States Patent
Dubrovsky et al.

(10) Patent No.: US 10,933,983 B2
(45) Date of Patent: Mar. 2, 2021

(54) UPPER TORQUE LINK CENTRAL LATCH MECHANISM

(71) Applicant: Safran Landing Systems Canada Inc., Ajax (CA)

(72) Inventors: Vladimir Dubrovsky, Maple (CA); Peter Yu, Markham (CA); Chris Bryant, Pickering (CA)

(73) Assignee: Safran Landing Systems Canada Inc., Ajax (CA)

( * ) Notice: Subject to any disclaimer, the term of this patent is extended or adjusted under 35 U.S.C. 154(b) by 106 days.

(21) Appl. No.: 15/666,370

(22) Filed: Aug. 1, 2017

(65) Prior Publication Data

US 2019/0039723 A1 Feb. 7, 2019

(51) Int. Cl.
*F16F 9/18* (2006.01)
*B64C 25/10* (2006.01)
(Continued)

(52) U.S. Cl.
CPC .............. *B64C 25/60* (2013.01); *B64C 25/10* (2013.01); *B64C 25/58* (2013.01); *B64F 5/40* (2017.01);
(Continued)

(58) Field of Classification Search
CPC .......... F16F 9/18; F16F 9/3207; F16F 9/2271; F16F 9/06; F16B 2/20; B64C 25/10; B64C 25/60; B64C 25/58; B64F 5/40
See application file for complete search history.

(56) References Cited

U.S. PATENT DOCUMENTS

| 2,446,700 A | * | 8/1948 | Giles | ..................... B64C 11/305 |
| | | | | 244/102 R |
| 2,534,962 A | * | 12/1950 | Flurscheim | ............. B64C 25/14 |
| | | | | 244/102 R |

(Continued)

FOREIGN PATENT DOCUMENTS

| EP | 2 910 466 A1 | 8/2015 |
| GB | 1 183 003 A | 3/1970 |

OTHER PUBLICATIONS

"Chapter 13 Aircraft Landing Gear Systems," U.S. Department of Transportation, Federal Aviation Administration, Aviation Maintenance Technician Handbook-Airframe, vol. 2, Published 2012 <https://www.faa.gov/regulations_policies/handbooks_manuals/aircraft/amt_airframe_handbook/media/ama_Ch13.pdf> [retrieved Feb. 7, 2018], pp. 1-96.

(Continued)

*Primary Examiner* — Melody M Burch
(74) *Attorney, Agent, or Firm* — Christensen O'Connor Johnson Kindness PLLC

(57) ABSTRACT

A torque link assembly for a shock strut includes an upper torque link that is selectively retained in a stowed position when uncoupled from a lower torque link. The upper torque link includes first and second coaxial lugs that rotatably couple the upper torque link to an alignment feature. A latch mechanism includes a latch fitting rotatably coupled to either the upper torque link or the alignment feature. The latch mechanism further includes a stop fitting fixedly coupled to the other of the upper torque link and the alignment feature. The latch fitting engages the stop fitting to maintain the upper torque link in the stowed position. At least one of the latch fitting and stop fitting is positioned between the first and second lugs of the upper torque link.

11 Claims, 7 Drawing Sheets

(51) Int. Cl.
*B64C 25/60* (2006.01)
*B64F 5/40* (2017.01)
*B64C 25/58* (2006.01)
*F16B 2/20* (2006.01)
*F16F 9/32* (2006.01)
*F16F 9/06* (2006.01)

(52) U.S. Cl.
CPC .................. *F16B 2/20* (2013.01); *F16F 9/18* (2013.01); *F16F 9/3207* (2013.01); *F16F 9/3271* (2013.01); *F16F 9/06* (2013.01)

(56) References Cited

U.S. PATENT DOCUMENTS

| | | | |
|---|---|---|---|
| 2003/0034242 A1* | 2/2003 | Mori ................... | H01H 3/3015 200/400 |
| 2006/0032976 A1* | 2/2006 | Bachmeyer ........... | B64C 25/505 244/104 R |
| 2008/0272234 A1* | 11/2008 | Thulbon ................ | B64C 25/14 244/102 R |
| 2012/0132742 A1* | 5/2012 | O'Connell ............. | B64C 25/50 244/100 R |

OTHER PUBLICATIONS

Cessna, "Model 680 and 750 Nose Gear Torque Link Connection," 8 separate video stills from video on YouTube. com, <https://www.youtube.com/watch?v=Cpmg_a8E93l&feature=youtu.be&t=37s> [retrieved Feb. 8, 2018], published Dec. 19, 2014, 8 pages.

Travel Online News, "Nose Landing Gear of Boeing 777-300/ER—close-up shots -," 3 separate video stills from video on YouTube. com, <https://www.youtube.com/watch?v=4Apda-7x1xg&feature=youtu.be&t=55s> [retrieved Feb. 8, 2018], published Oct. 6, 2014, 3 pages.

Extended European Search Report dated Dec. 6, 2018, issued in corresponding EP Application No. 18186455.4-1010, filed July 31, 2018, 6 pages.

Communication pursuant to Article 94(3) EPC dated Dec. 9, 2019, issued in corresponding EP Application No. 18186455.4-1010, filed Jul. 31, 2018, 5 pages.

* cited by examiner

UPPER TORQUE LINK CENTRAL LATCH MECHANISM

BACKGROUND

Deployable shock-absorbing vehicle struts, or shock struts, are used for vehicles such as aircraft. A typical shock strut, such as an "oleo strut" (air-oil absorber), includes a piston slidably disposed within a cylinder. The shock strut uses a fluid to convert kinetic energy into heat and to provide damping, and uses a gas to provide elastic spring characteristics. In aircraft, the shock strut cushions landing impacts and bump perturbations, and also dampens vertical oscillations. It is undesirable for an aircraft to bounce on landing, as bouncing could lead to a loss of directional control.

Shock struts generally include a torque link assembly to prevent the piston, and thus the landing gear wheels, from rotating relative to the cylinder about the common (longitudinal) axis of the piston and the cylinder. A known torque link assembly includes an upper torque link rotatably coupled to a steering collar (external to the cylinder) or a turning tube (internal to the cylinder) and a lower torque link rotatably coupled to the piston. The upper and lower torque links are rotatably coupled to each other to form a linkage that prevents the piston from uncontrolled rotation within the cylinder.

During aircraft maneuvering and landing gear maintenance, the upper and lower torque links may be disconnected from each other, and the upper torque link stowed in a raised position. Stowing the disconnected upper torque link in a raised position allows maintenance workers to rotate the wheels about the axis of the piston and cylinder and prevents the upper torque link from striking other landing gear components as the piston and wheels are rotated.

Known mechanisms for maintaining the upper torque link in a stowed position increase part count, weight, and costs. Accordingly, there is a need for a simplified mechanism for maintaining the upper torque link in a stowed position, while minimizing part count, weight, and costs.

SUMMARY

A first representative embodiment of the claimed subject matter includes a torque link assembly operably coupled to a shock strut. The shock strut comprises a piston slidably engaging and partially disposed within a cylinder. The torque link assembly has upper and lower torque links. The upper torque link includes first and second coaxial lugs, which rotatably link the upper torque link to an alignment feature. The lower torque link is rotatably coupled to the piston at one end and to the upper torque link at the opposite end. The torque link assembly further includes a latch mechanism configured to hold the upper torque link in a stowed position when the upper torque link is uncoupled from the lower torque link.

The latch mechanism includes a latch fitting rotatably coupled to either the upper torque link or the alignment feature. The latch mechanism also includes a stop fitting fixedly coupled to whichever of the upper torque link and the alignment feature the latch fitting is not coupled. The latch fitting engages the stop fitting when the upper torque link is rotated upwardly so that engagement of the latch fitting with the stop fitting supports the upper torque link.

According to a second representative embodiment of the claimed subject matter, a shock strut assembly includes a piston slidably disposed within a cylinder. A torque link assembly has an upper torque link rotatably attached to the cylinder by first and second lugs, and a lower torque link rotatably coupled at a first end to the piston. The upper torque link is rotatably coupled to the lower torque link by an apex pin that is selectively removable to allow the upper torque link to be rotated upward to a stowed position.

A latch mechanism includes a stop fitting fixedly coupled an alignment feature and at least partially disposed between the first and second lugs. The latch mechanism further includes a latch fitting rotatably coupled to the upper torque link so that the latch fitting selectively engages the stop fitting to maintain the upper torque link in the stowed position. A spring element biases the latch fitting toward the stop fitting.

A third representative embodiment of the claimed subject matter includes a method of stowing the upper torque link of a shock strut. The shock strut includes a piston at least partially disposed within a cylinder, an upper torque link having first and second lugs to rotatably couple the upper torque link to the cylinder and a lower torque link rotatably coupled to the piston and rotatably coupled to the upper torque link by an apex pin. A stop fitting is coupled to the cylinder and disposed between the first and second lugs. A latch fitting is rotatably coupled to the upper torque link.

The method includes the steps of disengaging/removing the apex pin and rotating the upper torque link upward until latch fitting contacts the stop fitting. The method further includes the steps of rotating the upper torque link upward so that contact between the latch fitting and the stop fitting rotates the latch fitting in a first direction, and rotating the latch fitting in a second direction so that the latch fitting engages the stop fitting to prevent downward rotation of the upper torque link.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
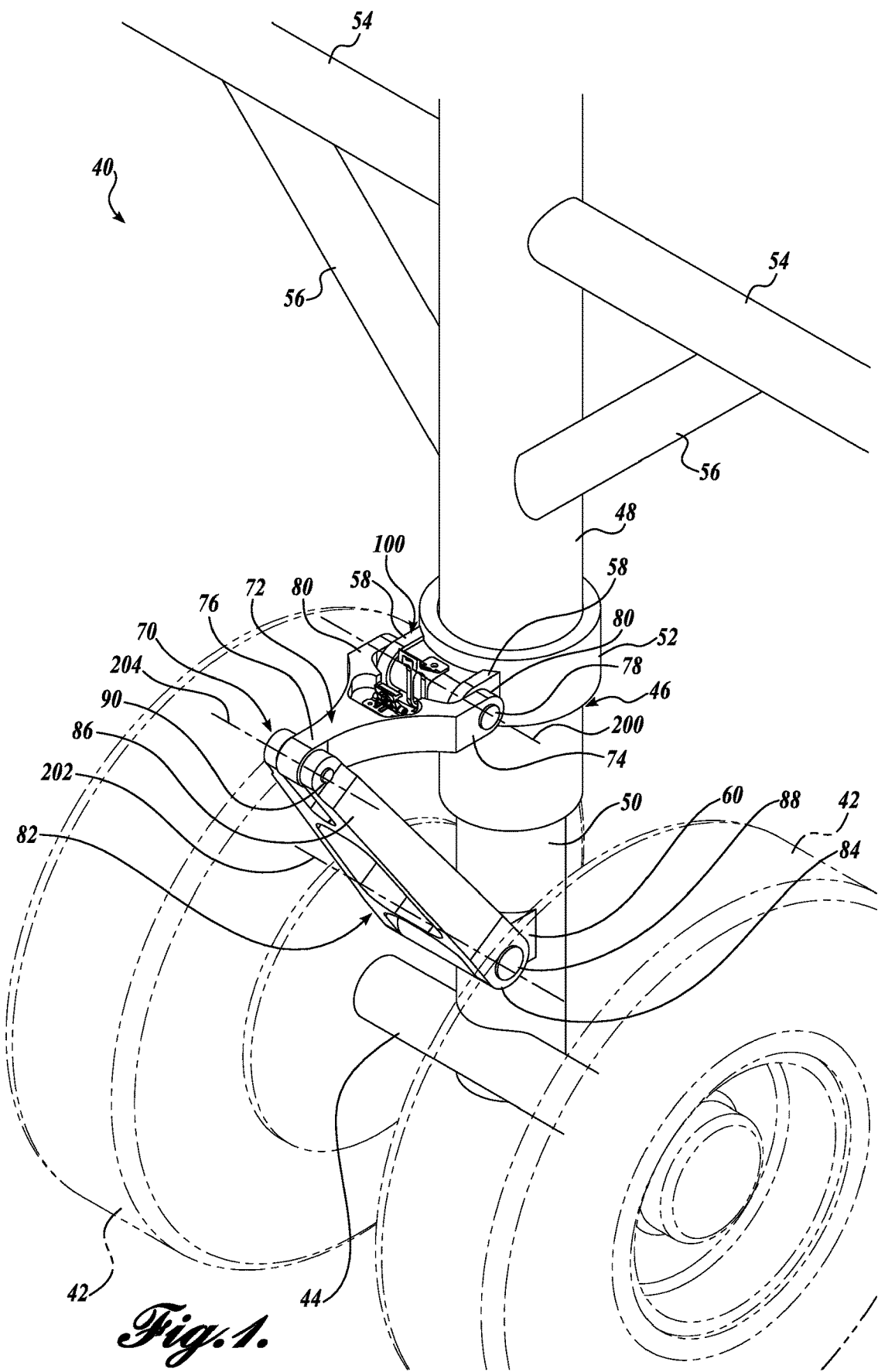
FIG. 1 shows an isometric view of a landing gear assembly with a representative embodiment of a torque link assembly with a latch mechanism according to the present disclosure, wherein an upper torque link is coupled to a lower torque link.

FIG. 1 shows an isometric view of a landing gear assembly 40 with a shock strut 46, torque link assembly 70, and latch mechanism 100 according to a representative embodiment of the present disclosure. In the illustrated embodiment, the landing gear assembly 40 is an airplane landing gear assembly; however, alternate embodiments are contemplated for use with other landing gear types, such as for a helicopter, or for any other suitable application using shock struts/torque link combinations.

The landing gear assembly 40 includes one or more wheels 42 rotatably mounted to an axle 44. The axle 44 is coupled to one end of a shock strut 46, which is coupled to the airplane (not shown) by a main fitting, which may comprise trunnions 54 and lateral braces 56, and/or any other suitable structure. When coupled to the airplane and in the deployed position, the landing gear assembly 40 supports the airplane and allows for the airplane to be maneuvered on the tarmac under its own power or by a tow vehicle. It will be appreciated that the present disclosure is not limited to the illustrated landing gear assembly, but can include any landing gear assembly that utilizes a shock strut, including those with different numbers of wheels, support carriages, deployment mechanisms, etc.

The shock strut 46 includes a piston 50 that telescopically engages a cylinder 48. The shock strut 46 is configured to cushion impacts (for example during landings) in a conventional manner, typically compressing a gas (for example nitrogen or air) contained in the shock strut 46 and dissipating the compression energy by performing work on an incompressible fluid (for example hydraulic fluid), also contained in the shock strut.

The torque link assembly 70 engages both an alignment feature 52 and the piston 50 to maintain the rotational position of the piston (about the longitudinal axis of the piston) relative to the alignment feature. In the disclosed embodiment, the alignment feature 52 is a steering collar that extends circumferentially around the exterior surface of the cylinder 48. The steering collar 52 is selectively rotatable about the longitudinal axis of the cylinder 48. Because torque link 70 maintains the rotational position of the steering collar 52 and the piston 50, the piston is selectively rotatable to steer the wheels 42 by selectively rotating the steering collar. At the same time, the linkage configuration of the torque link assembly 70 accommodates longitudinal movement of the piston 50 within the cylinder 48.

In the illustrated embodiment, the alignment feature 52 is a steering collar used to control the orientation of the landing gear wheels. It will be appreciated, however, that alternate configurations that use different alignment features are possible. In one alternate embodiment, the alignment feature is a turning tube (internal to the cylinder). In another alternate embodiment, the alignment feature is the cylinder or another structure that maintains a fixed location relative to the cylinder. In this regard, it is contemplated that the alignment feature 52 may be any feature with which it is desirable to maintain the rotational position of the piston and, therefore, the wheels, and such alternate embodiments should be considered within the scope of the present disclosure.

The torque link assembly 70 includes an upper torque link 72, a second end 76 of which is rotatably attached about axis 204 to a second end 86 of a lower torque link 82 with an apex pin 90. A first end 74 of the upper torque link 72 is rotatably connected about an axis 200 to an upper torque link mount 58, which is a clevis fork or socket positioned on a steering collar 52 coupled to the cylinder 48. More specifically, the upper torque link 72 is coupled to the upper torque link mount 58 with an upper pivot pin 78. A first end 84 of the lower torque link 82 is rotatably coupled about an axis 202 to a lower torque link mount 60 by a lower pivot pin 88. In the illustrated embodiment, the lower torque link mount 60 is rotatably coupled to the piston 50. The torque link assembly 70, therefore, is configured to accommodate axial motion between the piston 50 and the cylinder 48, and to react rotational or torsional forces from the piston 50 cylinder 48.

Figure 2:
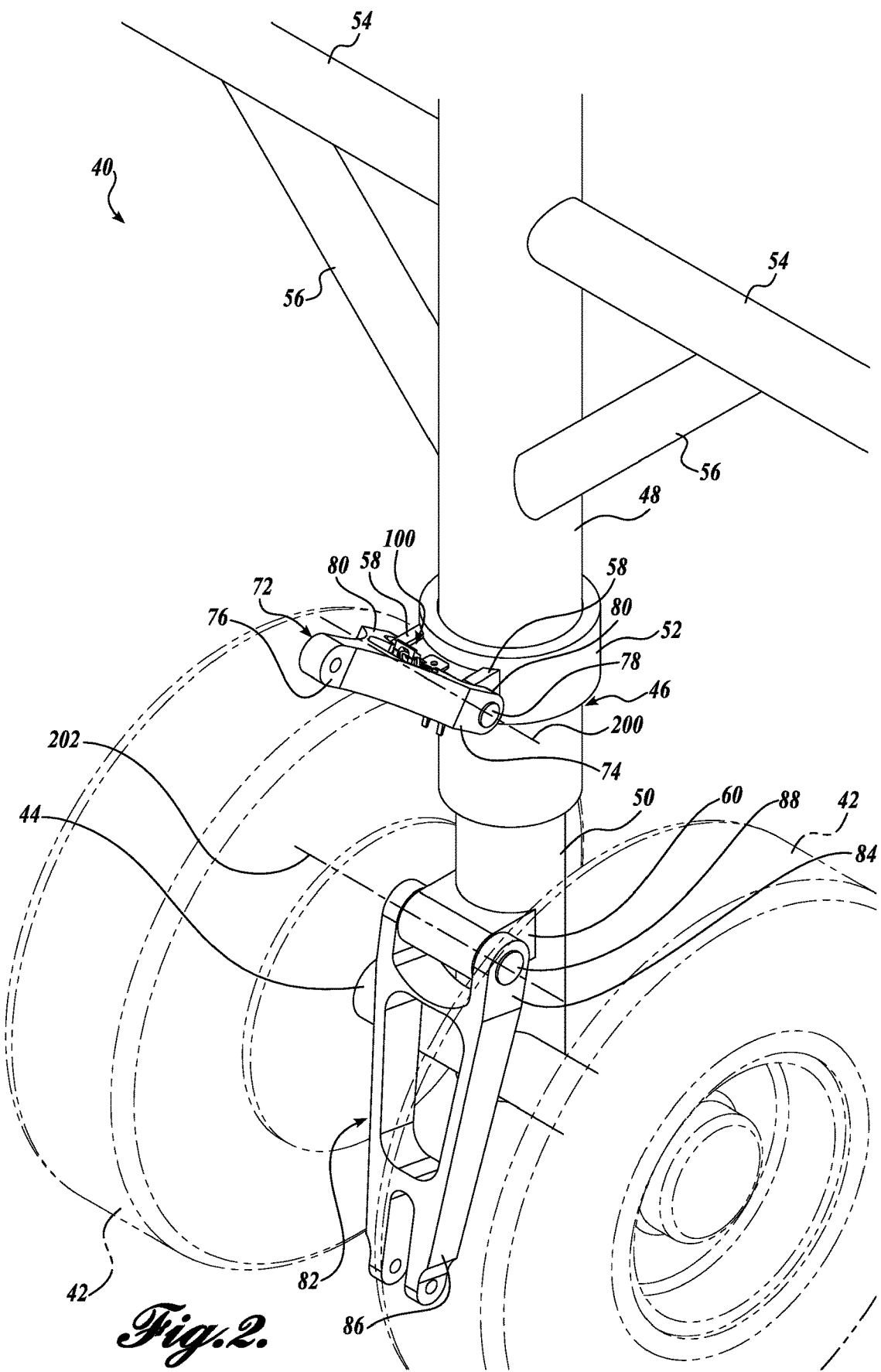
FIG. 2 shows the landing gear assembly of FIG. 1, wherein the upper torque link is uncoupled from the lower torque link, and the torque link latch mechanism maintains the upper torque link in a stowed position.

Referring now to FIG. 2, the landing gear 40 is shown with the apex pin 90 removed/disengaged from the torque link assembly 70 so that the piston 50 can rotate relative to the cylinder 48. The lower torque link 86 hangs down unrestrained or supported by lower torque link stop, from the lower pivot pin 88. The upper torque link 72 is secured in the stowed position by the latch mechanism 100. With the upper torque link 72 in the stowed position, the piston/wheels/tires are free to rotate 360 degrees about the centerline of the cylinder/piston without clashing with other landing gear components. The ability to rotate portions of the landing gear in this manner facilitates performance of various ground maneuvering and maintenance tasks.

Figure 3:
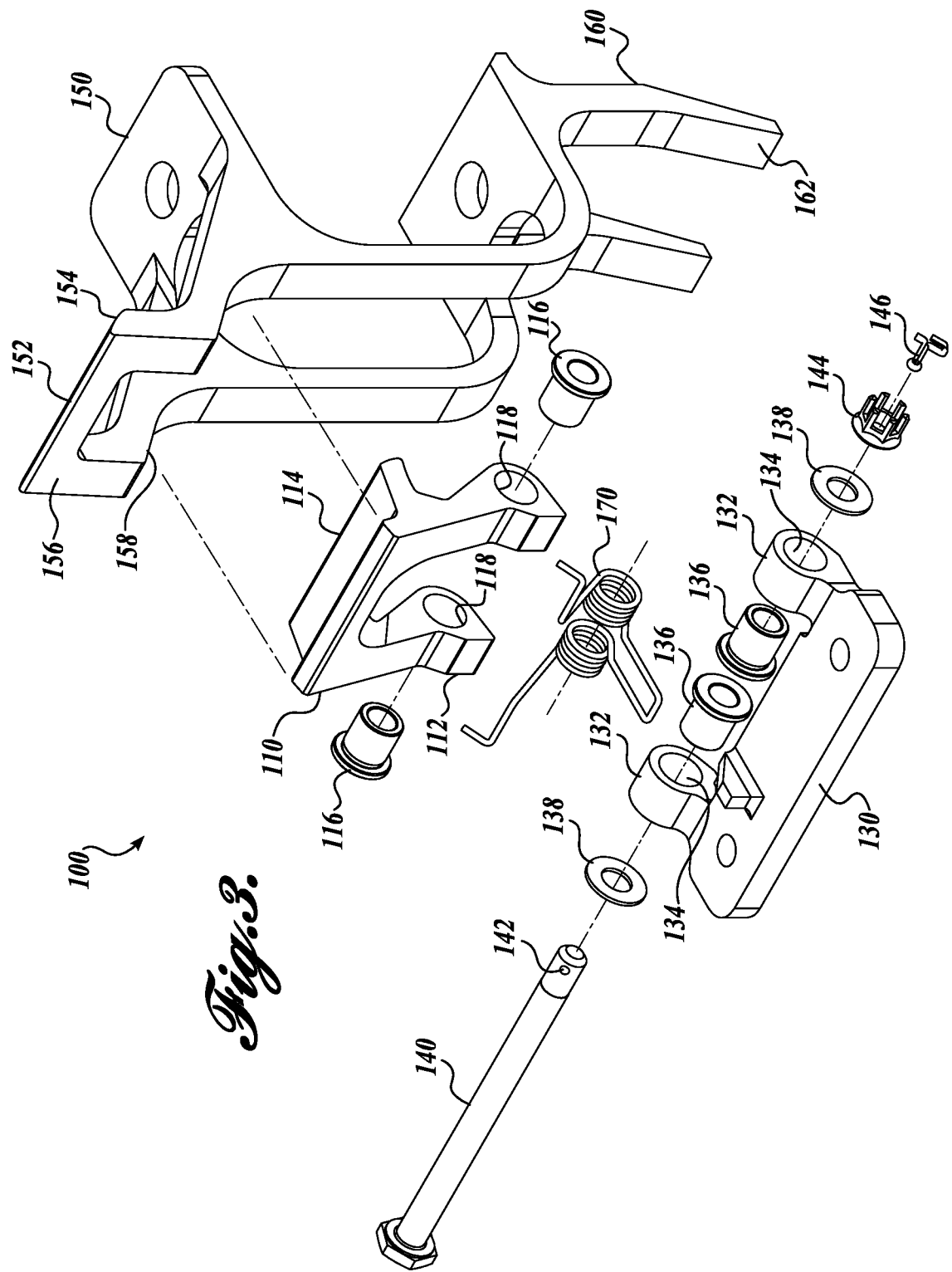
FIG. 3 shows an exploded isometric view of the latch mechanism of FIG. 1.

FIG. 3 shows an exemplary embodiment of a latch mechanism 100 configured to secure the upper torque link 72 in the stowed position. The latch mechanism 100 includes a latch fitting 110 in the form of a clevis 112. Coaxial holes 118 extend through the legs of the clevis 112 and have flanged bushings 116 installed therein. The latch fitting 110 includes a protrusion 114 sized and configured to engage a stop fitting 150. The latch fitting 110 is rotatably mounted to a base 130 that includes a plurality of lugs 132 having coaxial holes 134 extending therethough and a flanged bushing 136 installed in each hole.

The latch fitting 110 is rotatably coupled to the base 130 about axis 206 by a pin 140 that extends through the bushings 116 and 136 of the latch fitting. Washers 138 are installed under the head of the pin 140 and between the base 130 and a castellated nut 144 threadedly coupled to the pin. A cotter pin 146 extends through a hole 142 in the pin 140 and engages the castellated nut 144 to retain the nut on the pin. A spring 170 engages the latch fitting 110 and the base 130 to apply a biasing force that urges the latch fitting to rotate in a first direction about the axis 206, as viewed in FIG. 4. It will be appreciated that the disclosed combination of the latch fitting 110 and base 130 are exemplary only and should not be considered limiting. In this regard, various configurations that include different numbers and configurations of hinged connections, biasing elements, bushings, pins, etc. alone or in combination. Moreover, embodiments are contemplated in which a pin is press fit, swaged, or retained in the joint by any other suitable configuration. In addition, alternate embodiments are possible in which certain components of the joint, such as one or more of the biasing element, the bushings, the washers, etc. These and other alternate embodiments are contemplated and should be considered within the scope of the present disclosure Still referring to FIG. 3, the latch mechanism 100 further preferably includes a stop fitting 150. In the illustrated embodiment, the latch fitting 110 includes a C-shaped body sized and configured to be fixedly associated with the steering collar 52 of the shock strut 46. As shown, the stop fitting 150 is mounted to the upper torque link mount 58 of the steering collar 52; however, it will be appreciated that the stop fitting may be mounted to any suitable structure to maintain a fixed position relative to the steering collar 52. A lower stop 160 in the form of two elongate members extends downward from the body of the stop fitting 150. Each elongate member includes a lower stop surface 162 positioned to engage the upper torque link 72 to limit the downward travel of the upper torque link, i.e., to prevent the upper torque link from rotating down beyond a predetermined lower travel limit.

An upper stop 152 extends upward from the body of the stop fitting 150. The upper stop 152 includes one or more upper stop surfaces 158 that are positioned to engage the upper torque link 72 to prevent the upper torque link from rotating upward beyond a predetermined upper travel limit. The upper stop 152 further includes a cam surface 156 and a latching surface 154. As will be described below in further detail, the cam surface 156 and the latching surface 154 engage the latch fitting 110 during engagement of the latch mechanism 100 as the upper torque link 72 is raised to the stowed position.

Although the disclosed embodiment includes an upper stop 152 integrally formed with the stop fitting 150, it will be appreciated that other embodiments are possible in which the upper stop 152 is a separate element mechanically fastened to the stop fitting 150. In addition, embodiments are contemplated in which the upper stop is effected by incorporating a contact surface between the upper torque link and another component. These and other configurations are contemplated and should be considered within the scope of the present disclosure.

Figure 4:
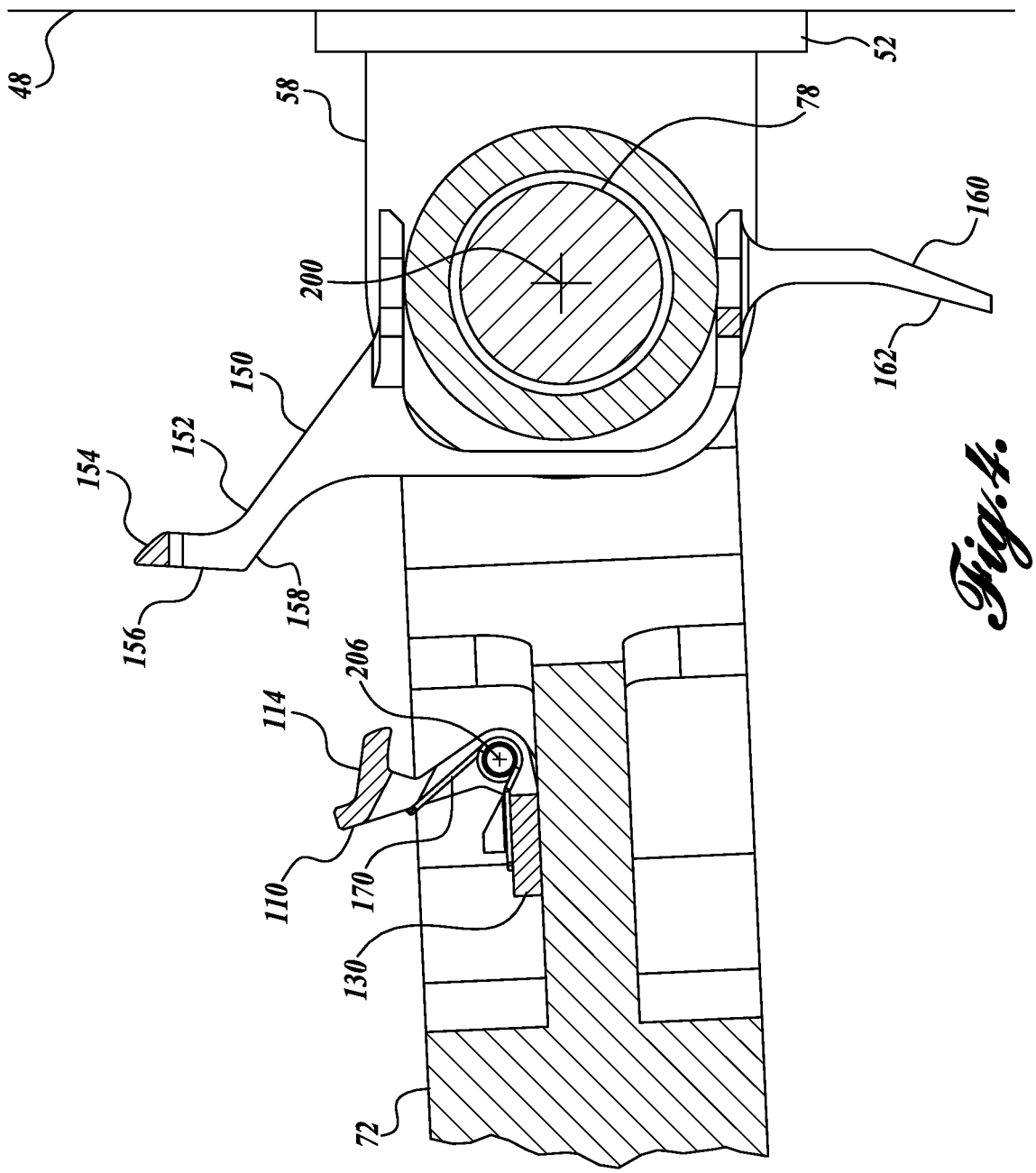
FIG. 4 shows a cross-sectional view of the latch mechanism of FIG. 1, wherein the upper torque link is uncoupled from the lower torque link and is in a raised position.

Referring now to FIGS. 4-7, operation of the latch mechanism 100 to selectively secure the upper torque link 72 in the stowed position will be described. FIG. 4 shows the torque link assembly 70 and the latch mechanism 100 raised to an arbitrary position by compression of the shock strut and corresponding displacement and rotation of the lower torque link. In this orientation, the latch fitting 110 is disengaged from the stop fitting 150, and the upper torque link 72 is free to rotate about axis 200 in response to axial motion between the piston 50 and the cylinder 48.

Figure 5:
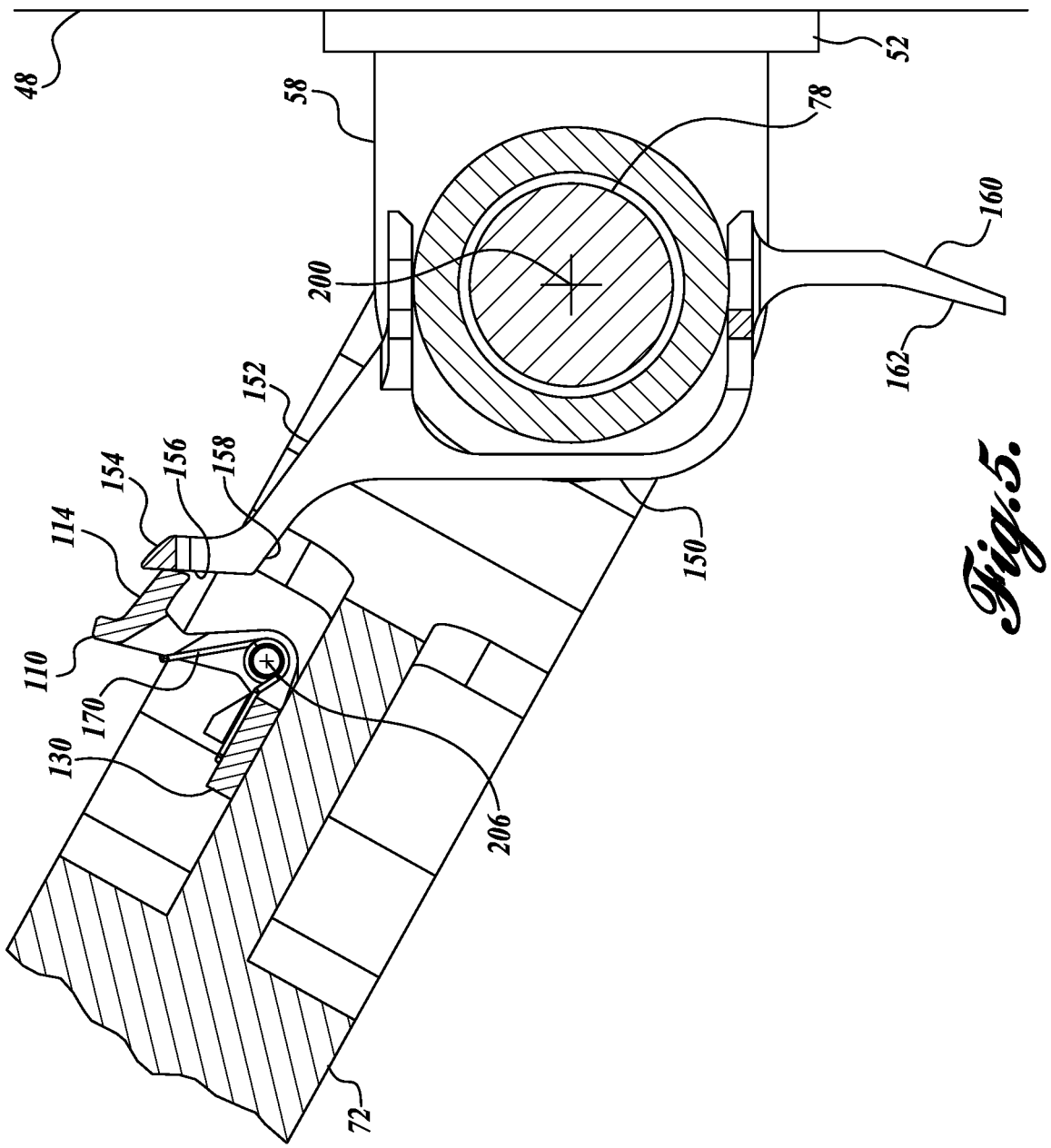
FIG. 5 shows a cross-sectional view of the latch mechanism of FIG. 1, wherein the upper torque link is rotated upward such that a latch fitting of the latch mechanism contacts a stop fitting of the latch mechanism.

Referring now to FIG. 5, to move the upper torque link 72 to the stowed position, an operator first removes or disengages the apex pin 90 from the torque link assembly 70 to disconnect the upper torque link from the lower torque link 82. With the upper torque link 72 disconnected from the lower torque link 82, the upper torque link is free to rotate upwardly about axis 200 (clockwise as shown in FIG. 5). The operator moves the upper torque link 72 upward until the protrusion 114 of the latch fitting 110 contacts the cam surface 156 of the stop fitting 150. With the latch fitting 110 in contact with the cam surface 156, further upward rotation of the upper torque link 72 about axis 200 causes the latch fitting to maintain sliding contact with the cam surface as the latch fitting moves upward. The contact of the latch fitting 110 with the cam surfaces 156 rotates the latch fitting 110 about axis 206 in a counterclockwise direction as shown in FIG. 5.

Figure 6:
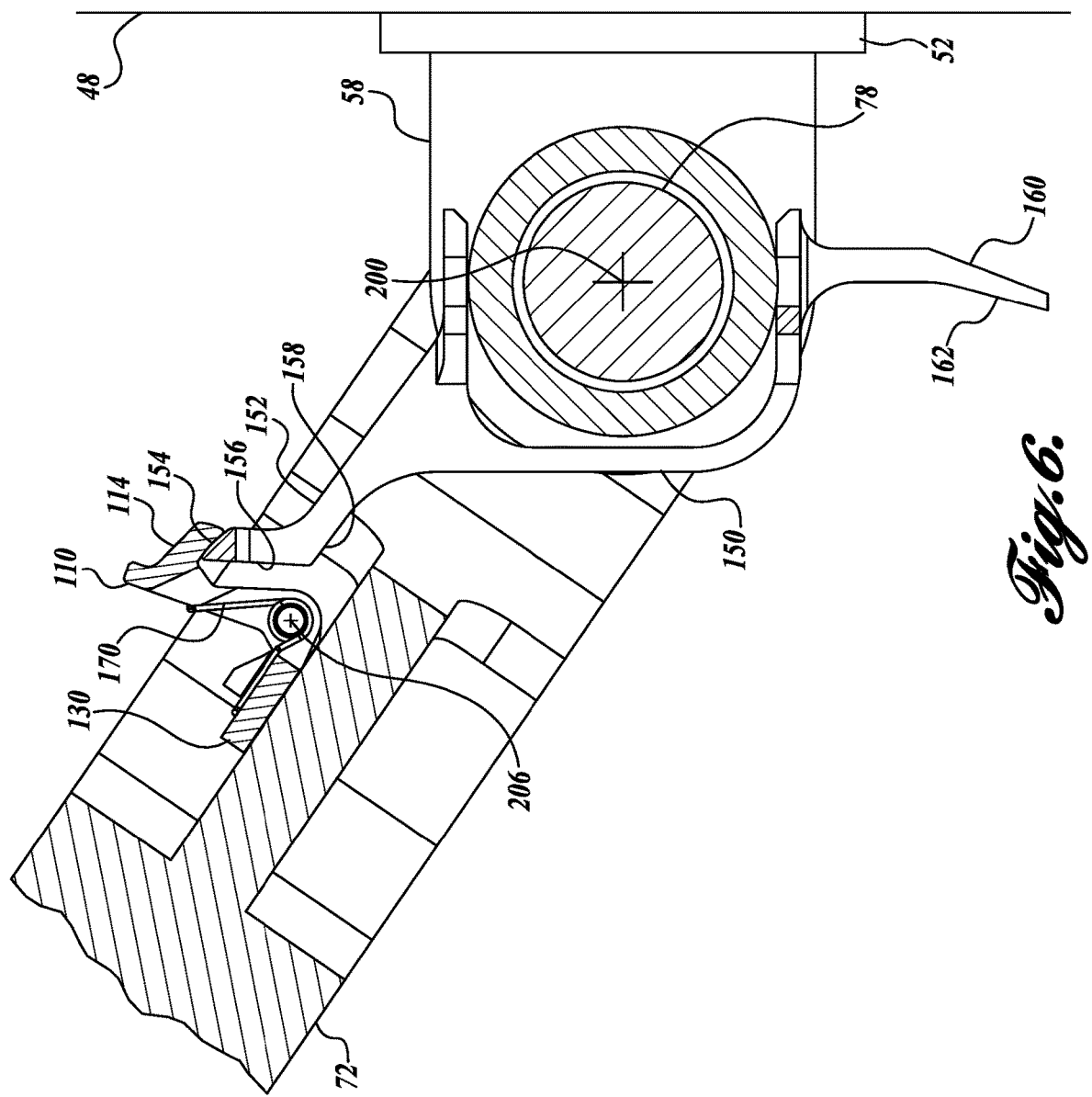
FIG. 6 shows a cross-sectional view of the latch mechanism of FIG. 1, wherein the latch mechanism supports the upper torque link is in the stowed position.

The operator continues to rotate the upper torque link 72 upwardly until the radius on the protrusion 114 of the latch fitting 110 becomes tangent with the radius on the upper end of the cam surface 156. With the cam surface 156 no longer engaging the latch fitting 110, the biasing force provided by the spring 170 (or a manual force for configurations without a spring) rotates the latch fitting 110 about axis 206 in a clockwise direction (as shown in FIG. 6) so that the protrusion 114 extends over the top of the upper stop 152. With the latch fitting 110 so positioned, the operator lowers the upper torque link 72. The protrusion 114 of the latch fitting 110 contacts the latching surface 154 of the upper stop 152 so that the stop fitting 150 supports the latch fitting 110 and, consequently, the upper torque link 72. Thus, the latch fitting 110 engages the stop fitting 150 to maintain the upper torque link 72 in the stowed position.

Figure 7:
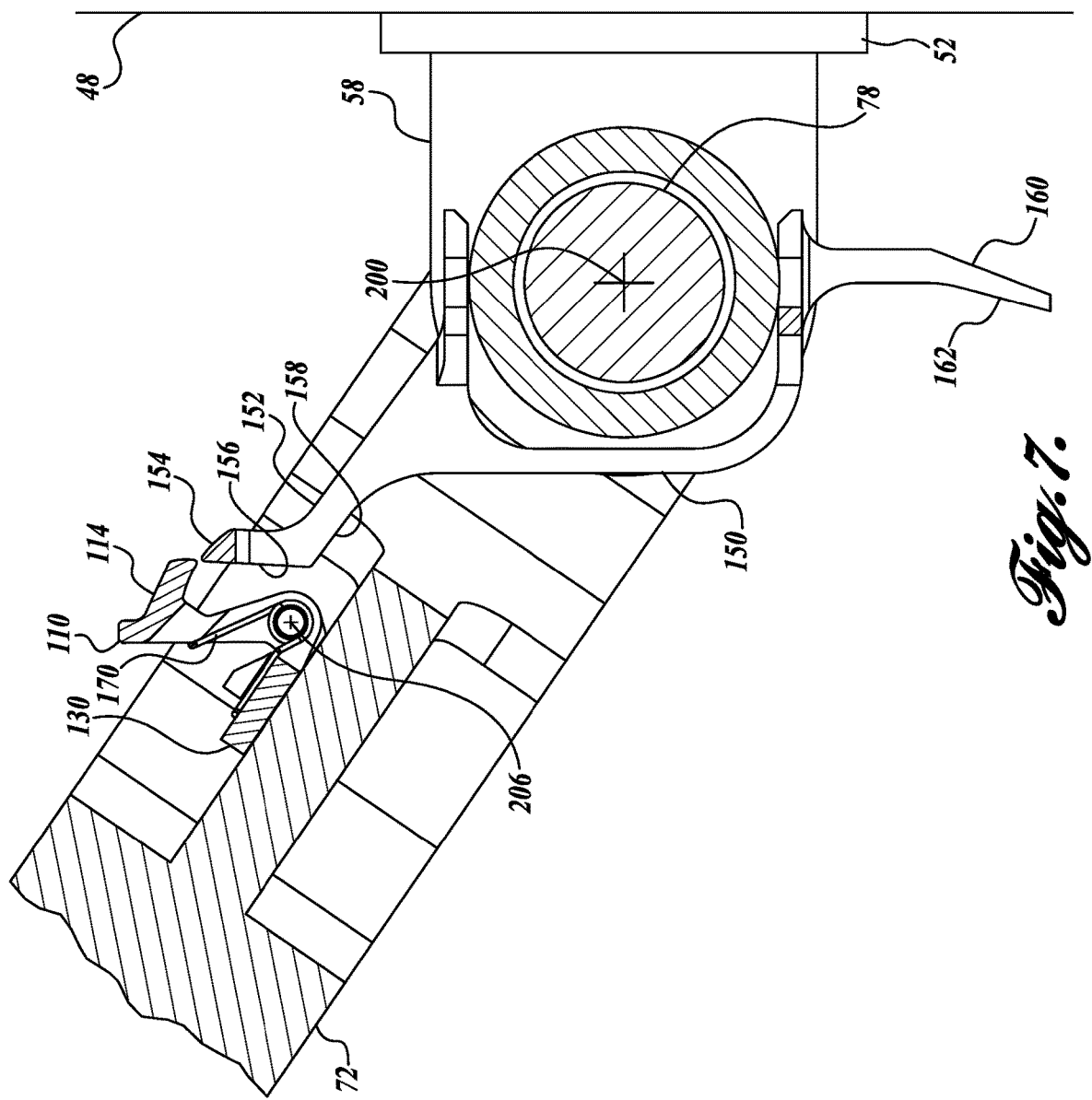
FIG. 7 shows a cross-sectional view of the latch mechanism of FIG. 1, wherein the latch fitting is rotated to disengage from the stop fitting.

Referring now to FIG. 7, to move the upper torque link 72 from the stowed position to a deployed position, i.e., to reconnect the upper torque link to the lower torque link 82, an operator manually rotates the latch fitting 110 about axis 200 in a counterclockwise direction as viewed in FIG. 7. With the latch fitting 110 rotated beyond the edge of the upper stop 152, the operator can lower the upper torque link 72 without the latch fitting engaging the stop fitting. It will be appreciated that depending upon the shape of the protrusion 154 and of the latching surface 154, it may be desirable or even necessary to rotate the upper torque link 72 slightly upward before rotating the latch fitting 110 in the counterclockwise direction.

The disclosed torque link latching system is advantageous in that it provides a simple, lightweight, and cost-effective way to stow the upper torque link to facilitate ground and maintenance operations. In addition, because the latch mechanism is positioned between the lugs of the upper torque link, the latching assembly is compact and does not increase the operating envelope of the shock strut and torque link assembly.

While representative embodiments have been illustrated and described, it will be appreciated that various changes can be made therein without departing from the spirit and scope of the invention. In one contemplated embodiment, the latch fitting is rotatably coupled to the steer collar, and the stop fitting is fixedly coupled to the upper torque link. Further, it will be appreciated that the specific configuration of one or more joints, fittings, springs, fasteners, etc. may vary to include other suitable configurations, and such alternate configurations should be considered within the scope of the present disclosure.

The embodiments of the invention in which an exclusive property or privilege is claimed are defined as follows:

1. A torque link assembly operably coupled to a shock strut, the shock strut comprising a piston slidably engaging and partially disposed within a cylinder, the torque link assembly being configured to limit rotation of the piston about a longitudinal axis relative to an alignment feature, the torque link assembly comprising:
    (a) an upper torque link comprising a first end with first and second lugs, the first and second lugs having a common first axis, the first end being rotatably coupled to the alignment feature about the first axis;
    (b) a lower torque link having a first end rotatably coupled to the piston about a second axis, wherein a second end of the upper torque link is configured to be rotatably coupled to a second end of the lower torque link about a third axis; and
    (c) a latch mechanism configured to hold the upper torque link in a stowed position when the upper torque link is uncoupled from the lower torque link, the latch mechanism comprising:
        (i) a latch fitting rotatably coupled to one of the upper torque link and the alignment feature about a fourth axis; and
        (ii) a stop fitting fixedly coupled to the other of the upper torque link and the alignment feature,
    wherein the upper torque link is upwardly rotatable about the first axis through a latching motion to move the latch mechanism from an unlatched position to a latched position, the latch fitting engaging a cam surface of the stop fitting during a first phase of the latching motion, the cam surface driving rotation of the latch fitting in a first direction about the fourth axis, the latch fitting disengaging from the cam surface of the stop fitting and rotating about the fourth axis in a second direction during a second phase of the latching motion, the latch fitting engaging the stop fitting in the latched position to prevent downward rotation of the upper torque link, the latch fitting being rotatable about the fourth axis in the first direction to disengage the latch fitting from the stop fitting, at least one of the latch fitting and stop fitting being disposed between the first and second lugs of the upper torque link.

2. The torque link assembly of claim 1, wherein the alignment feature is moveable relative to the cylinder.

3. The torque link assembly of claim 1, wherein the alignment feature comprises a steering collar.

4. The torque link assembly of claim 1, wherein the stop fitting comprises an upper stop surface that limits upward rotation of the upper torque link about the first axis.

5. The torque link assembly of claim 1, wherein the stop fitting comprises a lower stop surface that limits downward rotation of the upper torque link about the first axis.

6. The torque link assembly of claim 1, wherein the latch fitting slidably engages the cam surface to rotate the latch fitting in a first latch fitting direction about the fourth axis.

7. The torque link assembly of claim 6, wherein the latch fitting engages a latching surface formed on the stop fitting to prevent downward rotation of the upper torque link when the upper torque link is in the stowed position.

8. The torque link assembly of claim 7, further comprising a spring element biasing the latch fitting to rotate in a second latch fitting direction opposite the first latch fitting direction about the fourth axis.

9. A shock strut assembly, comprising:
(a) a cylinder;
(b) a piston slidably disposed within the cylinder; and
(c) a torque link assembly, comprising:
  (i) an upper torque link rotatably attached to an alignment feature by first and second lugs positioned at a first end of the upper torque link; and
  (ii) a lower torque link rotatably coupled at a first end to the piston; a second end of the upper torque link being rotatably coupled to a second end of the lower torque link by an apex pin, the apex pin being selectively disengageable to allow the upper torque link to be rotated upward to a stowed position; and
(d) a latch mechanism, comprising
  (i) a stop fitting fixedly coupled to the alignment feature and at least partially disposed between the first and second lugs;
  (ii) a latch fitting rotatably coupled to the upper torque link; and
  (iii) a spring element biasing the latch fitting to rotate in a first direction,
wherein the upper torque link is upwardly rotatable through an engagement motion to move the torque link assembly from an unlatched position to a latched position, the latch fitting engaging a cam surface of the stop fitting during a first phase of the engagement motion, the cam surface driving rotation of the latch fitting in a second direction, the latch fitting disengaging from the cam surface of the stop fitting and rotating in the first direction during a second phase of the engagement motion, the latch fitting engaging the stop fitting in the latched position to prevent downward rotation of the upper torque link, the latch fitting being rotatable in the second direction to disengage the latch fitting from the stop fitting.

10. The shock strut assembly of claim 9, wherein the stop fitting comprises an upper stop surface and a lower stop surface, the upper stop surface limiting upward rotation of the upper torque link, and the lower stop surface limiting downward rotation of the upper torque link.

11. A method of stowing an upper torque link of a shock strut, the shock strut comprising:
(a) a piston at least partially disposed within a cylinder;
(b) an alignment feature, the upper torque link having first and second lugs to rotatably couple the upper torque link to the alignment feature;
(c) a lower torque link rotatably coupled to the piston and rotatably coupled to the upper torque link by an apex pin;
(d) a stop fitting disposed between the first and second lugs; and
(e) a latch fitting rotatably coupled to the upper torque link;
the method comprising:
(a) at least one of disconnecting and removing the apex pin;
(b) rotating the upper torque link upward until latch fitting contacts the stop fitting;
(c) rotating the upper torque link upward so that contact between the latch fitting and the stop fitting drives the latch fitting to rotate in a first direction; and
(d) rotating the latch fitting in a second direction so that the latch fitting engages the stop fitting to prevent downward rotation of the upper torque link.

* * * * *